(12) United States Patent
Takase (10) Patent No.: US 6,728,048 B2
(45) Date of Patent: Apr. 27, 2004

(54) LENS SUPPORTING STRUCTURE

(75) Inventor: Yoshiyuki Takase, Oyama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/321,464

(22) Filed: Dec. 18, 2002

(65) Prior Publication Data

US 2003/0137753 A1 Jul. 24, 2003

(30) Foreign Application Priority Data

Jan. 22, 2002 (JP) ...................... 2002-012452

(51) Int. Cl.[7] ................................. G02B 7/02
(52) U.S. Cl. ...................... 359/819; 359/811

(56) References Cited

U.S. PATENT DOCUMENTS

| | | | |
|---|---|---|---|
| 4,436,375 A | * | 3/1984 | Meginnis .................. 359/894 |
| 5,048,050 A | * | 9/1991 | Komurasaki ................ 372/101 |
| 5,815,301 A | | 9/1998 | Naiki et al. |
| 5,897,196 A | * | 4/1999 | Soskind et al. ............. 362/507 |
| 5,943,153 A | | 8/1999 | Naiki et al. |

* cited by examiner

*Primary Examiner*—Ricky Mack
(74) *Attorney, Agent, or Firm*—Arnold International; Jon W. Henry; Bruce Y. Arnold (57) ABSTRACT

A lens supporting structure includes a mounting structure, such as an integral part of a housing, that includes one or more fixing parts that mate with one or more fixing parts of a lens holder. The fixing parts may be posts with screw holes on the housing, as well as screws passing through elongated holes on lens holder flanges. The lens supporting structure further includes securing parts on the mounting structure and on the lens holder, which may be elongated projections on the housing and the lens holder, that engage to prevent movement of the lens holder in a first direction at the same time that engagement of fixing parts, such as posts and the flanges, prevent movement of the lens holder in a second direction perpendicular to the first direction so that the lens holder can be simultaneously accurately positioned in both directions and then fixed in position.

20 Claims, 5 Drawing Sheets

(Prior Art)

LENS SUPPORTING STRUCTURE

BACKGROUND OF THE INVENTION

Copy machines, printers and similar image forming devices that use scanning laser beams generally include laser scanning optical systems. A laser scanning optical system may use light from a laser beam light source that passes through a collimating lens in order to provide collimated light that is transformed to lines by a cylindrical lens. The light is then reflected from a rotary polygon mirror through an f·θ lens to an image plane. Reflective mirrors are used to fold the light path between the laser and the image plane. The various optical elements are mounted in fixed positions on a housing that may, for example, be made of synthetic resin.

Figure 6:
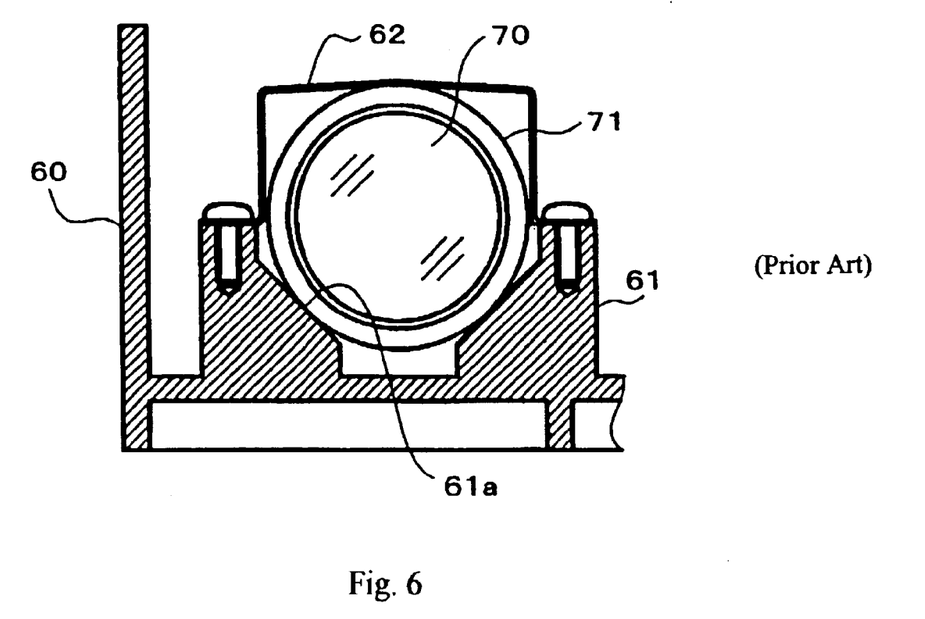
FIG. 6 shows a cross-sectional view of a first prior art lens supporting structure.

FIG. 6 shows a conventional lens supporting structure for a lens holder for a lens, such as a collimating lens. As shown in FIG. 6, lens 70 is held in place by positioning the lens holder 71, that holds the lens 70, in a V-shaped recess 61a of a mounting structure 61 that is integrally molded to form part of the housing 60. Lens holder 71 is held down elastically with a U-shaped plate spring 62 that is screwed on upper end surfaces of the mounting structure 61 that are on opposite sides of the lens holder 71. The lens holder 71 is held in contact with surfaces of the V-shaped recess 61a. That general arrangement is also disclosed in Japanese Laid-Open Patent Application H06-160745. In that application, the lens holder is inserted and fitted into a U-shaped recess of a housing and held by a plate spring. However, the elastic force of the plate spring may become less with time and allow undesired rotation of the lens holder about the optical axis of the lens that is held in the lens holder. Japanese Laid-Open Patent Application H05-11202 discloses a similar arrangement with a lens holder held by a plate spring in a U-shaped recess of a housing. That application discloses that adhesive may be used to prevent rotation of the lens holder. However, the use of adhesive prevents easy removal of the lens housing and increases the materials and the manufacturing steps required, thereby increasing production costs.

Figure 7:
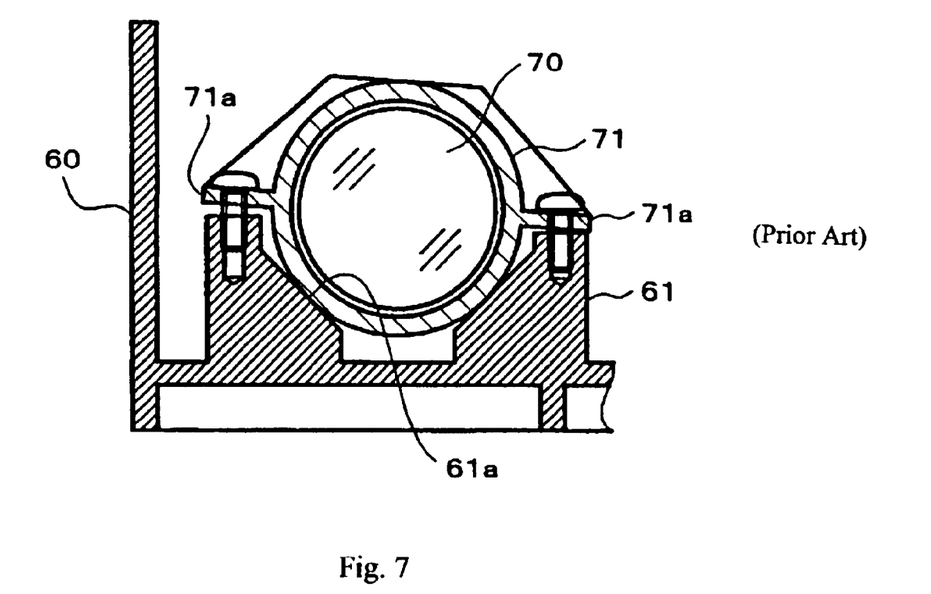
FIG. 7 shows a cross-sectional view of a second prior art lens supporting structure.

To avoid some of the problems of the embodiments of the two applications just discussed, an alternative known construction of a lens supporting structure, as shown in FIG. 7, uses flanges 71a on opposite sides of the lens holder 71. These flanges are screwed into the upper end surfaces of the recess 61a of the mounting structure 61 that is integrally molded to form part of the housing 60. To fix the position of the lens holder, as shown in FIG. 7, one of the flanges 71a is tightly screwed to one upper end surface of the recess 61a of the mounting structure 61 in order to bold the lens holder 71 in contact with surfaces of the recess 61a. However, as shown in FIG. 7, the other flange 71a may not be held in contact with the other upper end surface of the recess 61a due to dimensional tolerances and other variations during manufacture. Therefore, in many cases, the connection to the mounting structure 61 at the second flange may be weaker than intended and also may not provide the desired stability to the lens holder 71 and the lens 70.

Figure 8:
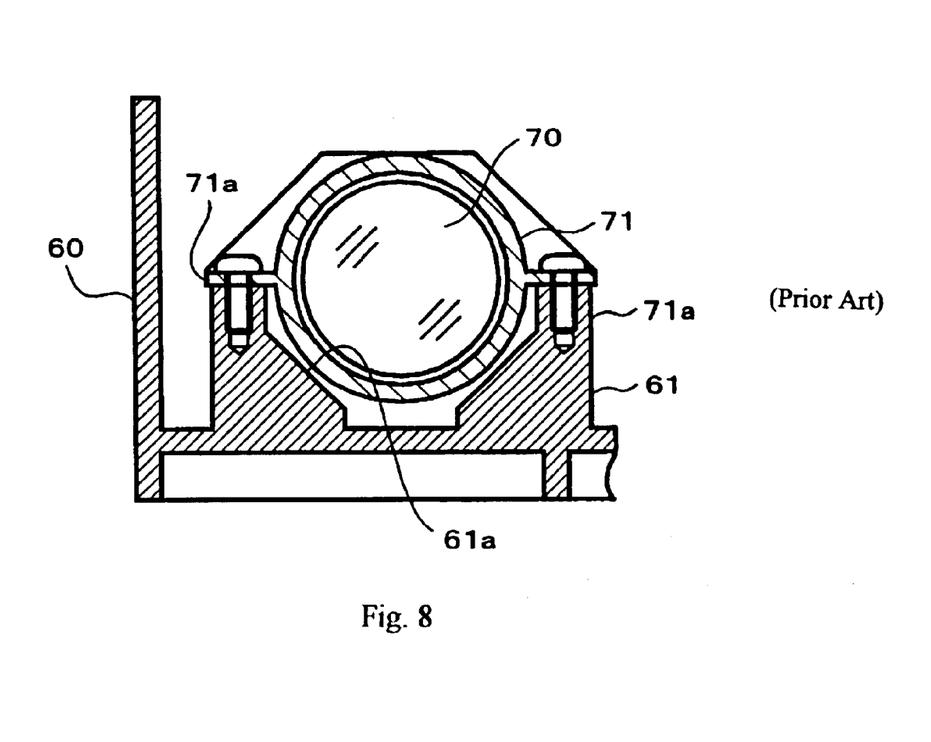
FIG. 8 shows a cross-sectional view of a third prior art lens supporting structure.

The undesirable optical effects of instability of the lens holder may be especially severe when the lens holder is holding a cylindrical lens, which optical systems, including laser beam scanning optical systems, often include. As shown in FIG. 8, vertical positioning of the lens holder with tight contact of both flanges 71a of the lens holder 71 with the upper end surfaces of the recess 61a may be achieved by leaving a gap between the lens holder and the surfaces of the recess 61a. However, that arrangement provides less stability of the lens holder in the other direction perpendicular to the optical axis. That instability is especially undesirable when the lens holder is holding a collimating lens, which optical systems, including laser beam scanning optical systems, often include. In either the FIG. 7 or FIG. 8 prior art embodiments, it is impossible to establish a light path with high accuracy because the optical axis of a lens held in the lens holder cannot be reliably aligned.

BRIEF SUMMARY OF THE INVENTION

The present invention relates to a lens supporting structure of inexpensive construction that fixes a lens onto a housing with high accuracy and stability. The lens holding structure of the present invention may be used in laser scanning optical systems, including those used in copiers and printers.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

The lens supporting structure of the present invention includes a lens holder that is secured to amounting structure in order to provide a reliable and stable positioning of a lens in the lens holder so that the lens can provide a desired light output. The lens holder includes a central axis and is designed so that the central axis of the lens holder may coincide with the optical axis of a lens that the lens holder is designed to hold. The lens holder includes one or more flanges. Each flange includes a fixing part for connection to a fixing part of the mounting structure to hold the lens holder in a stable position relative to the mounting structure in a first direction (X-direction) perpendicular to the central axis of the lens holder. The lens holder also includes a securing part for engagement with a securing part of the mounting structure to hold the lens holder in a stable position relative to the mounting structure in a second direction (Y-direction) perpendicular to the central axis of the lens holder. The X-direction and Y-direction are perpendicular to each other as well as to the central axis of the lens holder.

Fixing parts on a flange and on the mounting structure are connected at the same time that the securing parts on the lens holder and the mounting structure are engaged, but their simultaneous engagements are independent and do not interfere with one another. As a result, in the present invention, it is possible to fix the lens on the mounting structure with a high degree of accuracy and stability. Also, it can be performed with minimal cost because of the simple construction.

As one example, one of the securing parts may be a recess or groove and the other securing part may be a projection that is inserted in the recess or groove. In this construction, the positioning in the X-direction of the holder is fixed by contact between fixing parts of a flange and a mounting structure as the projection is inserted in the recess or groove to hold the lens holder in the Y-direction.

The lens holder of the present invention is applicable, for example, to collimating lenses and cylindrical lenses that may be used in laser scanning optical systems.

Figure 1:
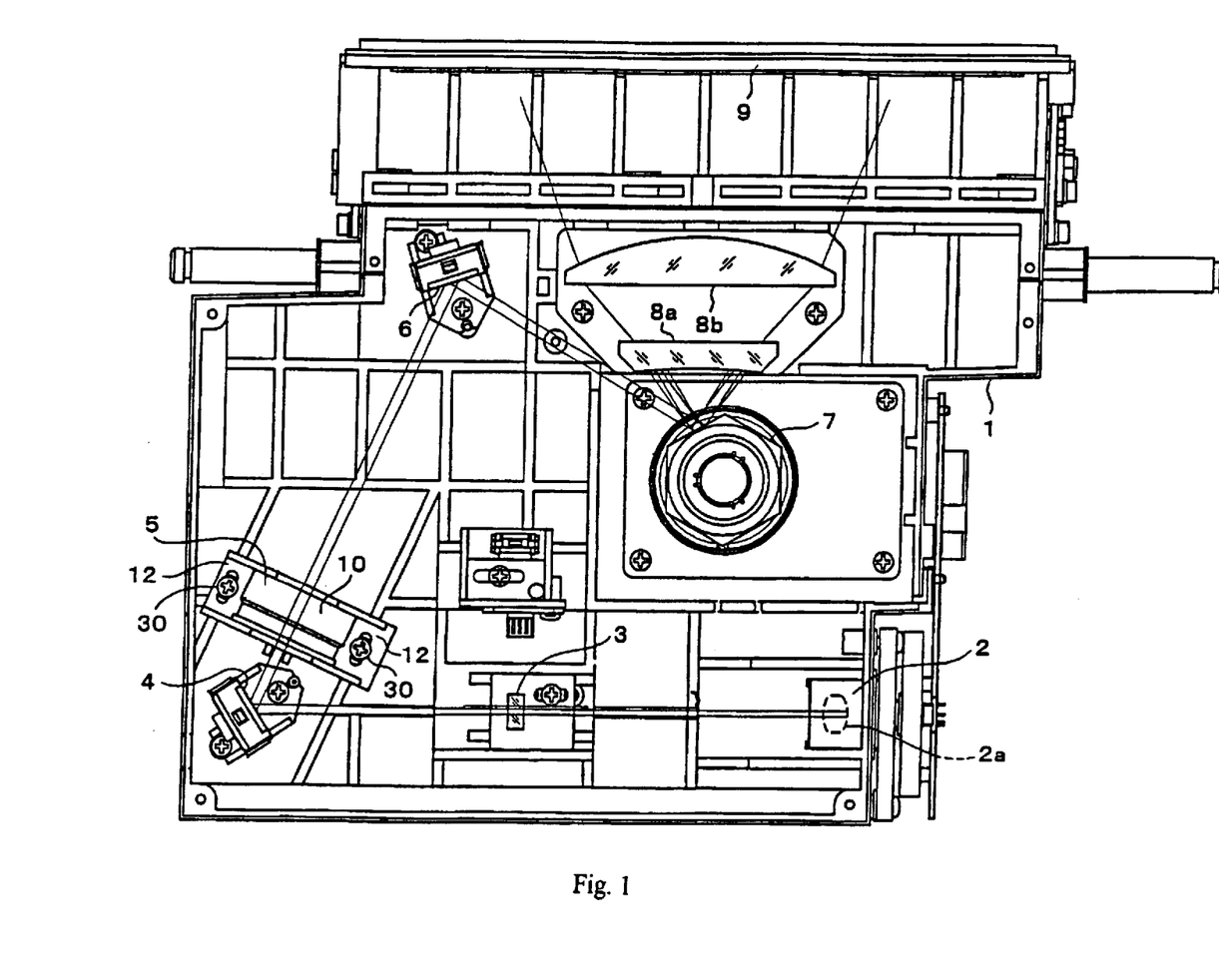
FIG. 1 shows a plan view of a laser scanning optical system that includes a lens supporting structure of the present invention.

FIG. 1 shows a plan view of a laser scanning optical system that includes a lens supporting structure of the present invention. The laser scanning optical system of FIG. 1 is part of a laser scanning, full color image formation device that includes a resinous housing 1 as the mounting structure. In FIG. 1, the laser light source 2 emits light of four wavelengths of light with image information, Y (yellow), M (magenta), C (cyan) and MK (black). The light passes through a first lens 2a, a second lens 3, is reflected from the first mirror 4 and is transformed to lines by passing through a third lens of a lens assembly 5. Next, the laser beam is reflected from the second mirror 6 and then is reflected from the rotary polygon mirror 7. The laser beam reflected from the rotary polygon mirror 7 passes through an f·θ lens formed of lens components 8a and 8b, and is reflected by a folding mirror 9 that may reflect the light through further optics (not shown in the drawings) to an image location (not shown in the drawings).

Embodiment 1

Figure 2:
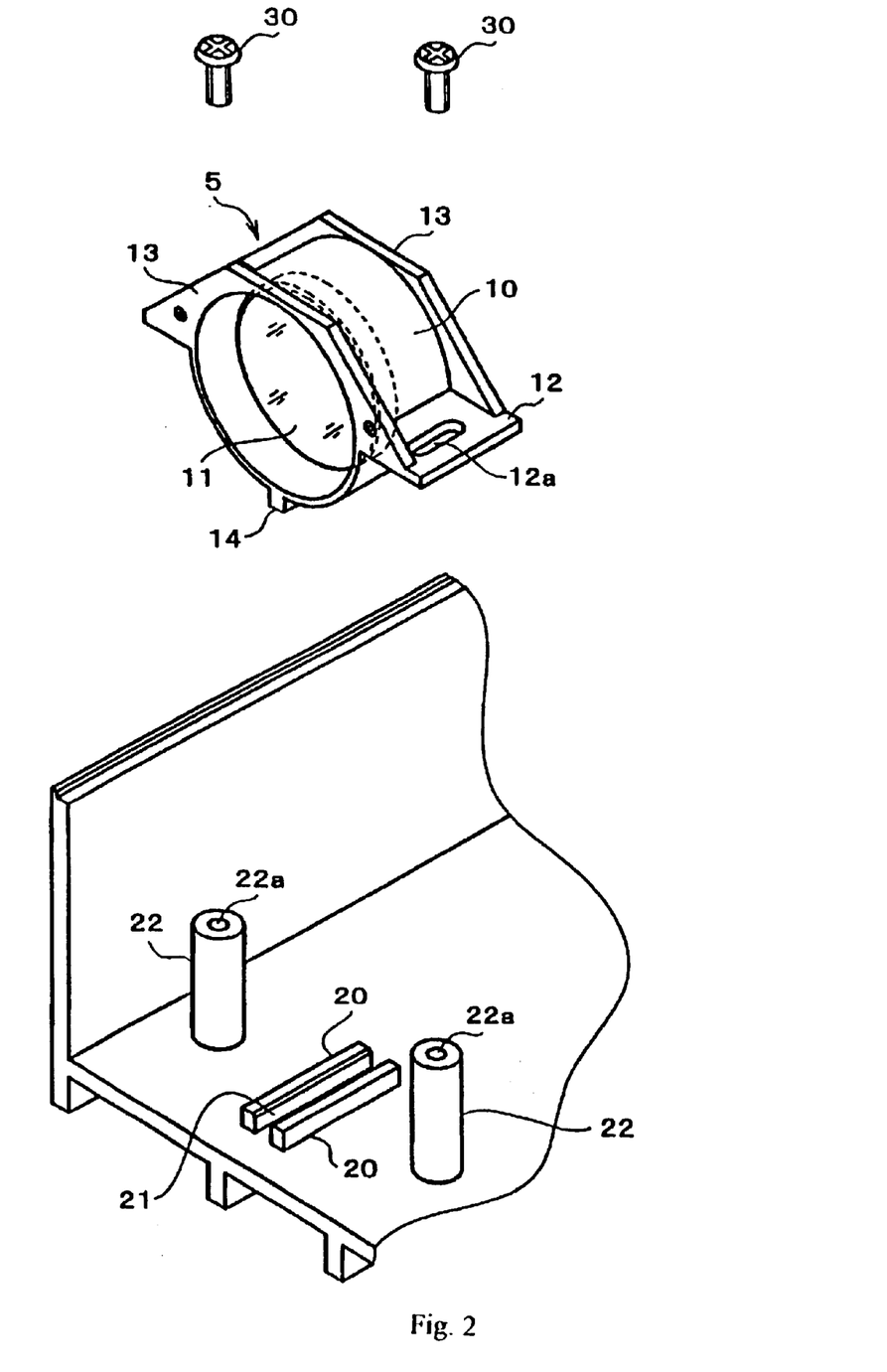
FIG. 2 shows an exploded perspective view of a lens supporting structure according to Embodiment 1 of the present invention.
Figure 3:
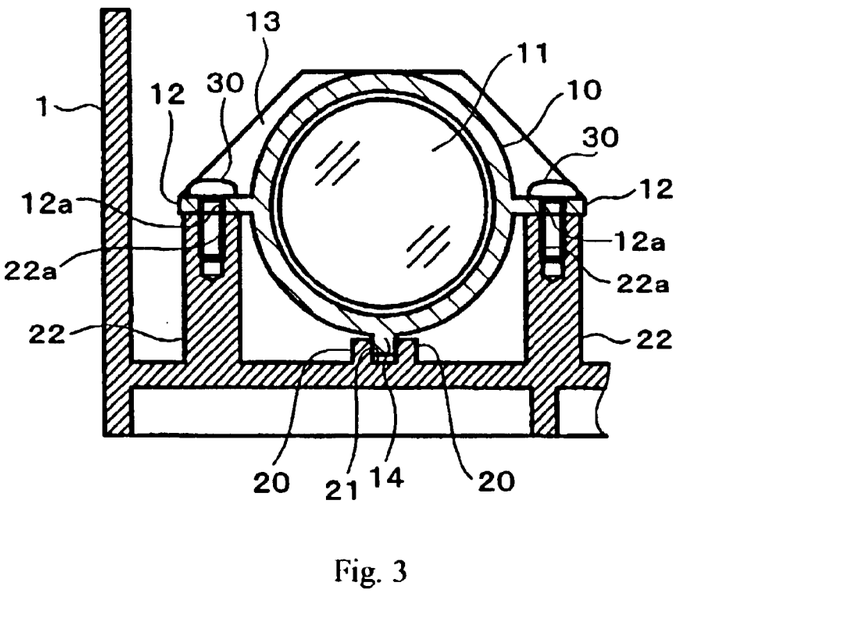
FIG. 3 shows a cross-sectional view of the lens supporting structure according to Embodiment 1 of the present invention.

FIG. 2 shows an exploded perspective view of a lens supporting structure according to Embodiment 1 of the present invention, and FIG. 3 shows a cross-sectional view thereof. As shown in FIG. 2, the lens supporting structure of the present invention includes a lens assembly 5 with a lens 11 fixed concentrically inside a cylindrical portion of a lens holder 10. As shown in FIGS. 2 and 3, a pair of flanges 12 extend in the radial direction, 180 degrees apart, from opposite sides of a cylindrical outer surface of the lens holder 10 and in a plane that passes through and includes the central axis of the cylindrical portion of the lens holder 10. As shown in FIGS. 2 and 3, the flanges extend in the direction of the central axis of the cylindrical portion of the lens holder 10 (Z-direction) which is substantially aligned with the optical axis of the lens 11 that the lens holder 10 holds. Each flange 12 includes an elongated hole 12a that is elongated in the Z-direction. Each flange and elongated hole is a fixing part of the lens support structure. The flanges are connected by trapezoidal reinforcing ribs 13 on the front and back of the cylindrical portion of the lens holder 10. The trapezoidal reinforcing ribs 13 are on one side of the flanges and lie in a plane that is perpendicular to the central axis of the cylindrical portion of the lens holder 10. On the other side of the flanges, an elongated projection 14 that is square in cross-section and elongated in the direction of the central axis extends outwardly from the cylindrical portion of the lens holder 10. The elongated projection 14 is a securing part of the lens support structure.

As shown in FIGS. 2 and 3, integrally formed with the housing 1 is a mounting structure that includes a pair of guide walls 20 that are elongated to form parallel guide walls that define a guide recess or groove 21. The guide recess or groove is a securing part of the lens support structure. Further, on each side of the guide recess or groove 21, a post 22 is formed on the mounting structure. The posts are fixing parts of the lens support structure. During assembly, the elongated projection 14 is inserted in the guide recess or groove 21 so that the central axis of the lens holder extends in the direction of elongation of the guide recess or groove 21. The lens holder 10 is then free to slide back and forth in the direction of the central axis relative to the lens housing, but the lens holder 10 is constrained by the pair of guide walls 20 from movement in the first direction (X-direction) perpendicular to the central axis of the lens holder.

On the upper end surface of each post 22, a screw hole 22a for receiving a screw 30 is formed. The screws and screw holes are fixing parts. The distance between the screw holes 22a is equal to the distance between the elongated holes 12a formed on each flange 12 of the lens holder 10. During assembly, each flange 12 of the lens holder 10 is placed on a corresponding upper end surface of a post 22 as the elongated projection 14 is inserted into the guide recess or groove 21, so that the positioning of the flange 12 in the vertical direction (Y direction) is set. In this state, as shown in FIG. 3, the tip of the elongated projection 14 is above the bottom surface of the guide recess or groove 21, and there is a gap between the guide walls 20 and the lens holder 10.

The assembly procedure for fixing the lens holder 10 to the mounting structure of the housing 1 begins with the elongated projection 14 of the lens holder 10 being inserted in the guide recess or groove 21 while the flanges 12 are placed on the upper end surfaces of the posts 22. The clearance between the tip of the elongated projection 14 and the bottom of the guide recess or groove helps assure full contact of the flanges 12 with the upper end surfaces of the posts 22. Additionally, the construction and dimensioning of the various elements assures that there is a gap between the guide walls 20 and the cylindrical outer surface of the lens holder 10. Next, the lens holder 10 is adjusted back and forth in the direction of the central axis until it is in the proper position. Then, the flanges 12 are screwed to the posts 22 with screws 30 that pass through the elongated holes 12a into screw holes 22a.

The connection of the elongated projection 14 and the guide recess or groove 21 constrains the movement of the lens holder 10. The movement of the lens holder 10 in the Y-direction perpendicular to the central axis of the lens holder is constrained by the flanges 12 being placed on the upper ends of the posts 22. The arrangement assures that positioning of the lens holder 10 on the mounting structure of the housing 1 in the X-direction and in the Y-direction is done simultaneously but independently, without the positioning in one direction interfering with the positioning in the other direction. As a result, highly accurate and stable positioning can be achieved. Because the flange 12 and the elongated projection 14 are formed on the lens holder 10 and the guide recess or groove 21 and the posts 22 are formed on a single mounting structure, the construction is simple and inexpensive. The construction may be even further simplified by integrally forming the mounting structure, which includes the guide recess or groove 21, with the housing 1.

Embodiment 2

Figure 4:
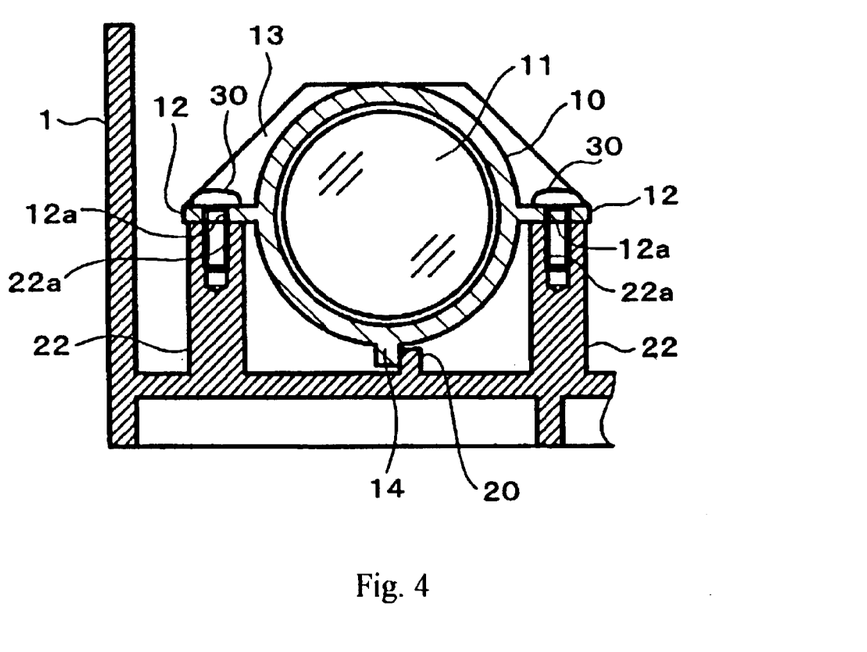
FIG. 4 shows a cross-sectional view of a lens supporting structure according to Embodiment 2 of the present invention.

FIG. 4 shows a cross-sectional view of a lens supporting structure according to Embodiment 2 of the present invention. In Embodiment 2 there is only one guide wall 20 and the elongated projection 14 of the lens holder 10 is held in contact with one side surface of this guide wall 20 by elastically biasing the elongated projection 14 against the guide wall 20 with, for example, a plate spring (not shown in the drawings). According to this modified example, the position of the lens holder 10 in the X-direction varies little during positioning in the Y-direction, even though positioning in one direction does not interfere with positioning in the other direction. In addition, positioning in the two directions is achieved independently, because the biased engagement between the elongated projection 14 and the guide wall 20 prevents any large movement of the lens holder in the X-direction while the final positions in the X-direction and the Y-direction are simultaneously achieved.

Embodiment 3

Figure 5:
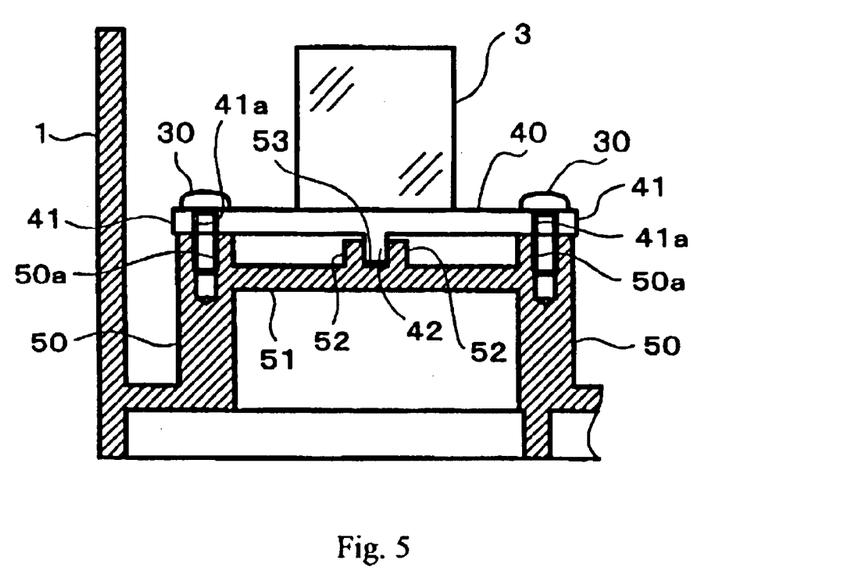
FIG. 5 shows a cross-sectional view of a lens supporting structure according to Embodiment 3 of the present invention.

FIG. 5 shows a cross-sectional view of Embodiment 3 of the present invention, wherein the lens supporting structure supports lens assembly 3 of the laser scanning optical system of FIG. 1. In Embodiment 3, lens assembly 3 is secured to a plate lens holder 40 with flanges 41 formed on both ends. Each flange includes an elongated hole 41a that is elongated in the Z-direction which is substantially parallel to the optical axis of the lens that the plate lens holder 40 holds. On the side of the plate lens holder 40 that is opposite from the lens assembly 3, a projection 42 that is square in cross-section and elongated in the Z-direction is formed on the center of the lower surface. The projection 42 is a securing part of the lens support structure. A mounting structure, that is integrally formed on the housing 1, includes a pair of wall-shaped supports 50, connected by a connecting plate 51. On the upper end surface of each support 50, a screw hole 50a is formed, for connecting a flange of the plate lens holder 40 to each support by a screw 30 passing through the elongated hole 41a of the flange. In the top center of connecting plate 51, a guide recess or groove 53 is formed by a pair of projections 52 that are elongated to form parallel guide walls that extend in the Z-direction and define a guide recess or groove that is a securing part of the lens support structure.

During assembly of the lens support structure, the elongated projection 42 is first inserted in the guide recess or groove 53 as the flanges 41 come in contact with the upper ends of the supports 50 so that the plate lens holder 40 is constrained from movement in both the X-direction and the Y-direction, but the plate lens holder is free to slide in the Z-direction. Next, the plate lens holder 40 is adjusted back and forth in the Z-direction to the proper position. During the positioning operation, the flanges 41 of the plate lens holder 40 may be loosely connected by screws 30 passing through the elongated holes 41a into the screw holes 50a of the supports 50, but only a loose connection that does not prevent back and forth sliding of the plate lens holder 40 is used. When the plate lens holder is properly positioned in the Z-direction, the flanges are screwed tightly to the posts to achieve precise positioning of the plate lens holder. In order to maintain the proper positioning of the plate lens holder in the Y-direction, contact is established between the flanges 41 and the upper end surface of the supports 50. In order to maintain the proper positioning of the plate lens holder in the X-direction, projection 42 is received by the guide recess or groove 53. In this manner, the position of the plate lens holder relative to the mounting structure, which may be integrally formed with the housing, is fixed. In this state, the projection 42 is raised from the bottom surface of the guide recess or groove 53 and there is a gap between the top of the guide walls 52 and the bottom of the plate lens holder 40.

As in the previous embodiments, in Embodiment 3 positioning of the plate lens holder in the X-direction and Y-direction is done without interference between the two positionings, and therefore highly accurate and stable fixed positioning between the plate lens holder and a mounting structure, such as a housing, can be simply and inexpensively achieved.

The present invention is not limited to the aforementioned embodiments, as it will be obvious that various alternative implementations are possible. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A lens supporting structure, comprising:
   a mounting structure that includes a first fixing part and a first securing part;
   a lens holder that includes a second securing part and a first flange; wherein
   the lens holder is constrained from movement relative to the mounting structure in a first direction by engagement of the first fixing part and the first flange as a result of prior movement of the lens holder in the first direction at the same time that the lens holder is constrained from movement relative to the mounting structure in a second direction, that is perpendicular to the first direction, by engagement of the first securing part and the second securing part.

2. The lens supporting structure of claim 1, wherein the mounting structure is an integral part of a housing.

3. The lens supporting structure of claim 1, wherein one of the first securing part and the second securing part is a projection and the other of the first securing part and the second securing part is a recess, and the lens holder is constrained from movement relative to the mounting structure in the second direction by engagement of the projection and recess as a result of said prior movement of the lens holder in the first direction.

4. The lens supporting structure of claim 3, wherein the recess is a groove that extends in a direction that is perpendicular to both the first and second directions when the lens holder is constrained from movement relative to the mounting structure in a first direction by engagement of the first fixing part and the first flange, and the lens holder is constrained from movement relative to the mounting structure in a second direction, that is perpendicular to the first direction, by engagement of the first securing part and the second securing part.

5. The lens supporting structure of claim 2, wherein one of the first securing part and the second securing part is a projection and the other of the first securing part and the second securing part is a recess, and the lens holder is constrained from movement relative to the mounting structure in the second direction by engagement of the projection and recess as a result of said prior movement of the lens holder in the first direction.

6. The lens supporting structure of claim 5, wherein the recess is a groove that extends in a direction that is perpendicular to both the first and second directions when the lens holder is constrained from movement relative to the mounting structure in the first direction by engagement of the first fixing part and the first flange, and the lens holder is constrained from movement relative to the mounting structure in a second direction, that is perpendicular to the first direction, by engagement of the first securing part and the second securing part.

7. The lens supporting structure of claim 1, wherein the lens holder holds one of a collimating lens or a cylindrical lens for a laser scanning optical system.

8. The lens supporting structure of claim 2, wherein the lens holder holds one of a collimating lens or a cylindrical lens for a laser scanning optical system.

9. The lens supporting structure of claim 3, wherein the lens holder holds one of a collimating lens or a cylindrical lens for a laser scanning optical system.

10. The lens supporting structure of claim 4, wherein the lens holder holds one of a collimating lens or a cylindrical lens for a laser scanning optical system.

11. The lens supporting structure of claim 5, wherein the lens holder holds one of a collimating lens or a cylindrical lens for a laser scanning optical system.

12. The lens supporting structure of claim 6, wherein the lens holder holds one of a collimating lens or a cylindrical lens for a laser scanning optical system.

13. The lens supporting structure of claim 1, wherein the first flange includes a second fixing part for fixing the lens holder to the mounting structure by attachment with the first fixing part.

14. The lens supporting structure of claim 13, wherein the second fixing part includes an elongated hole with its direction of elongation extending in a third direction that is perpendicular to the first and second directions when the lens holder is constrained from movement relative to the mounting structure in a first direction by engagement of the first fixing part and the first flange, and the lens holder is constrained from movement relative to the mounting structure in a second direction, that is perpendicular to the first direction, by engagement of the first securing part and the second securing part.

15. The lens supporting structure of claim 2, wherein the first flange includes a second fixing part for fixing the lens holder to the mounting structure by attachment with the first fixing part.

16. The lens supporting structure of claim 15, wherein the second fixing part includes an elongated hole with its direction of elongation extending in a third direction that is perpendicular to the first and second directions when the lens holder is constrained from movement relative to the mounting structure in a first direction by engagement of the first fixing part and the first flange, and the lens holder is constrained from movement relative to the mounting structure in a second direction, that is perpendicular to the first direction, by engagement of the first securing part and the second securing part.

17. The lens supporting structure of claim 1, wherein the lens holder includes a second flange and the mounting structure includes a second fixing part, and the lens holder is constrained from movement relative to the mounting structure in a first direction by engagement of the first fixing part with the first flange and by engagement of the second fixing part with the second flange, both as a result of prior movement of the lens holder in the first direction at the same time that the lens holder is constrained from movement relative to the mounting structure in a second direction, that is perpendicular to the first direction, by engagement of the first securing part and the second securing part.

18. The lens supporting structure of claim 17, wherein each of the first and second flanges includes a fixing part for engagement with one each of the first and second fixing parts of the mounting structure so as to fix the lens holder to the mounting structure.

19. The lens supporting structure of claim 2, wherein the lens holder includes a second flange and the mounting structure includes a second fixing part, and the lens holder is constrained from movement relative to the mounting structure in a first direction by engagement of the first fixing part with the first flange and by engagement of the second fixing part with the second flange, both as a result of prior movement of the lens holder in the first direction at the same time that the lens holder is constrained from movement relative to the mounting structure in a second direction, that is perpendicular to the first direction, by engagement of the first securing part and the second securing part.

20. The lens supporting structure of claim 19, wherein each of the first and second flanges includes a fixing part for engagement with one each of the first and second fixing parts of the mounting structure so as to fix the lens holder to the mounting structure.

* * * * *

UNITED STATES PATENT AND TRADEMARK OFFICE
CERTIFICATE OF CORRECTION

PATENT NO. : 6,728,048 B2
DATED : April 27, 2004
INVENTOR(S) : Takase

It is certified that error appears in the above-identified patent and that said Letters Patent is hereby corrected as shown below:

Column 1,
Line 52, change "to bold" to -- to hold --; and

Column 2,
Line 54, change "amounting" to -- a mounting --.

Signed and Sealed this

Thirtieth Day of November, 2004

JON W. DUDAS
*Director of the United States Patent and Trademark Office*